United States Patent [19]

Goettler

[11] 4,248,743
[45] Feb. 3, 1981

[54] PREPARING A COMPOSITE OF WOOD PULP DISPERSED IN A POLYMERIC MATRIX

[75] Inventor: Lloyd A. Goettler, Akron, Ohio

[73] Assignee: Monsanto Company, St. Louis, Mo.

[21] Appl. No.: 67,587

[22] Filed: Aug. 17, 1979

Related U.S. Application Data

[63] Continuation-in-part of Ser. No. 13,846, Feb. 22, 1979, abandoned, which is a continuation of Ser. No. 816,606, Jul. 18, 1977, abandoned.

[51] Int. Cl.$^3$ .............................................. C08L 1/02
[52] U.S. Cl. ..................... 260/17.4 BB; 260/17.4 CL
[58] Field of Search ................. 260/17.4 CL, 17.4 BB

[56] References Cited

U.S. PATENT DOCUMENTS 2,550,143  4/1951  Eger ............................ 260/17.4 BB
3,697,364  10/1972  Boustany et al. .

FOREIGN PATENT DOCUMENTS 472118  9/1937  United Kingdom ............. 260/17.4 BB Primary Examiner—Edward M. Woodberry
Attorney, Agent, or Firm—Gordon B. Seward

[57] ABSTRACT

A composite of polymeric matrix and wood pulp is prepared by masticating such proportion of polymeric matrix as provides a continuous phase and wood pulp having a tensile strength below about 10 kg/cm$^2$. Water is added if needed to provide the requisite low tensile strength.

9 Claims, 2 Drawing Figures

PREPARING A COMPOSITE OF WOOD PULP DISPERSED IN A POLYMERIC MATRIX

This is a continuation-in-part of copending application Ser. No. 13,846, filed Feb. 22, 1979 now abandoned, which in turn is a continuation of then-copending application Ser. No. 816,606, filed July 18, 1977, now abandoned.

The invention relates to preparing a composite of wood pulp uniformly dispersed in a polymeric matrix without extensively damaging the constituent cellulose fiber. The agglomerates of fiber in wood pulp must be separated into individual components for use either as a filler or as a reinforcing agent for polymers.

BACKGROUND OF THE INVENTION

Composites of a matrix reinforced with wood fiber and other short cellulose fiber are described by Boustany and Coran U.S. Pat. No. 3,697,364, Oct. 10, 1972, the disclosure of which is incorporated herein by reference. The pretreatment of the fiber with organic polymer to effect predispersion and minimize fiber damage upon subsequent mixing into the matrix is described as an essential part of a process for preparing high performance composites. Improvements in the pretreatment of wood fiber with organic polymers are described by Hamed U.S. Pat. No. 3,943,079, Mar. 9, 1976. The conjoint use of a lubricant such as process oil enhances receptiveness of the fiber to the polymer. The present invention provides a process of preparing composites of wood pulp and elastomers without such pretreatment.

SUMMARY OF THE INVENTION

In accordance with the present invention, a composite of polymeric matrix and wood pulp is prepared by masticating such proportion of polymeric matrix, including massed polymer as provides a continuous phase and wood pulp having a tensile strength of below about 10 kg/cm$^2$, regardless of the direction of measurement and such amount of water as to provide the aforesaid tensile strength. Pulp sheet, a common form of wood pulp, has a significant tensile strength and for the purposes of this invention, the proportion of water wet pulp sheet that is water is usually within the range of 20–65% by weight, preferably 35–65%, and still more preferably, 35–50%. Too little water will inhibit separation of the fiber. An excess of water beyond that required to reduce the tensile strength to the aforesaid low value which ideally will be substantially zero has no noticeable adverse effect on the fiber; but the physical presence of excess of water may interfere with the mixing.

The proportion of plastic polymer is sufficient to provide a massed composite of fiber and matrix material in the mixer, including the polymer, in which the matrix material is the continuous phase. Thus, a proportion of polymer to provide a continuous matrix phase is to be understood as a proportion sufficient to form such composite as expelled from the mixer as contrasted to polymer coated fiber which may be largely in the form of an aggregate; and, therefore, particulate. Polymeric matrix materials comprise highly viscous polymers which flow sufficiently with or without heating to be processable.

Polymers which can be used effectively are both thermoplastic polymers and thermosetting polymers, and are usually essentially organic polymers, although inorganic polymers can be used.

Among the thermoplastic polymers which can be advantageously employed are poly(vinylchloride), poly(vinylacetate, ethylene-vinylacetate copolymers, polyesters, polyamides (such as nylon), polyolefins, polystyrene, SAN copolymers and ABS copolymers. Thermoplastic elastomers which can be used include butadiene/styrene or butadiene/isoprene copolymers, block polyesters and thermoplastic polyurethanes.

Among the thermosetting polymers which can be used to advantage, vulcanizable elastomers, such as natural and synthetic rubber are preferred. Some of the useful synthetic rubber types include cis-1,4-polybutadiene, cis-1,4-polyisoprene, butyl rubber, neoprene, copolymers of butadiene or isoprene with styrene, acrylonitrile, isobutylene or methyl methacrylate, and vulcanizable ethylene/propylene/diene terpolymers. Other thermosetting polymers include phenolic or melamine resins, silicones and epoxies.

The invention is particularly suited to preparing composites from elastomeric matrix material either of the thermoplastic or thermosetting type. Thermosetting elastomers are processable in the unvulcanized state, but vulcanizable to a state in which the plastic properties are greatly diminished. Vulcanizable elastomers are preferred for use in the process of the invention. Of course, the fiber must be incorporated before vulcanization. It is advantageous and preferred to have a particulate filler such as carbon black or silica as part of the matrix material.

The addition of water to wood pulp sheet or other agglomerated forms having significant tensile strengths reduces the tensile strength to acceptable low values that implement fiber dispersion and integrity. Preferably, the tensile strength is reduced to less than three kg/cm$^2$. The bulk of the water is usually squeezed out during the masticating step and evaporated by the heat generated in mixing. In mixing water saturated wood pulp with thermoplastic substances which soften above the boiling point of water, it is important to effect the mixing before the water evaporates. Wood pulp available having the requisite properties may be used unchanged. For example, wet forms of wood pulp known as "slush pulp" and "wet lap" may possess the water content required for the process of the invention or such water content obtained by slight adjustment. The invention is, in part, the discovery that low tensile strength wood pulp agglomerates can be made to disperse directly into massed polymer compositions. It will be appreciated that the preparation of fiber concentrates, i.e. wood fiber pretreated with elastomer or other organic adjuvants for subsequent dilution is outside the present invention which provides a process whereby such pretreating step can be eliminated.

The advantage of water as a cellulose plasticizer to treat cellulose for use in reinforcing elastomer was recognized by Coran and Boustany supra, but the water performs a different function in the present invention, and is required in substantially greater amounts. On the other hand, the invention also avoids the step of dispersing the cellulose fiber in an aqueous slurry as described by the aforesaid investigators. Wood pulp is treated with water to form a coherent water-wet wood pulp mass having water absorbed therein sufficient to render the fiber agglomerates separable when subjected to shearing forces, the shearing forces being applied by mixing with massed polymer. The extent and rate of dispersion will depend upon the intensity of shear which, in turn, will be influenced by the design of the mixer and rheological properties of the polymer. Of course, the polymer must be of such consistency that it can be mixed in the selected mixer. Elastomeric polymers which have a high elastic recovery may require addition of filler or other material to dissipate stored elastic energy.

The process is not limited to but is useful for preparation of high performance composites of elastomeric matrix and unregenerated discontinuous wood cellulose fiber, as described by Boustany and Coran supra for which purpose fiber bonding agents will be added to the composition. Suitable bonding systems, fiber aspect ratios and fiber loadings are described by Boustany and Coran. The invention is not limited to any minimum fiber loading. For example, for some purposes, only 1% by weight of wood pulp on a dry weight based on the weight of the elastomer are desired. For the preparation of high performance composites, the wood pulp on a dry basis will usually be between 4%–40% by volume.

DESCRIPTION OF PREFERRED EMBODIMENTS

Figure 1:
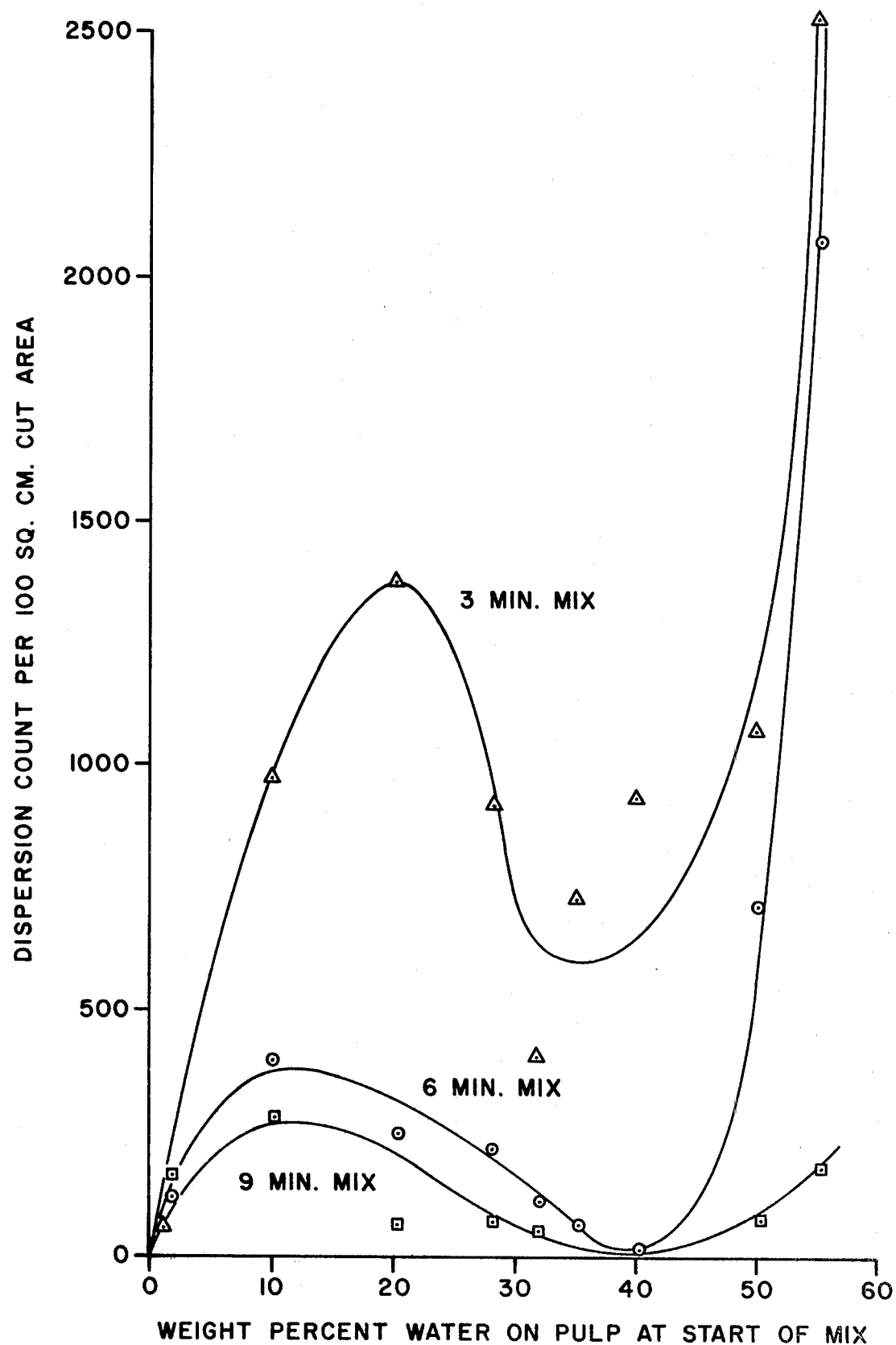
FIG. 1 is a graph, for three different mixing times, of the number of visible clumps of fiber (dispersion count) per 100 cm$^2$ of area exposed by cutting a composite of rubber and fiber plotted against the percent by weight water of the sum of fiber plus water in the fiber compositions used to prepare the composite.
Figure 2:
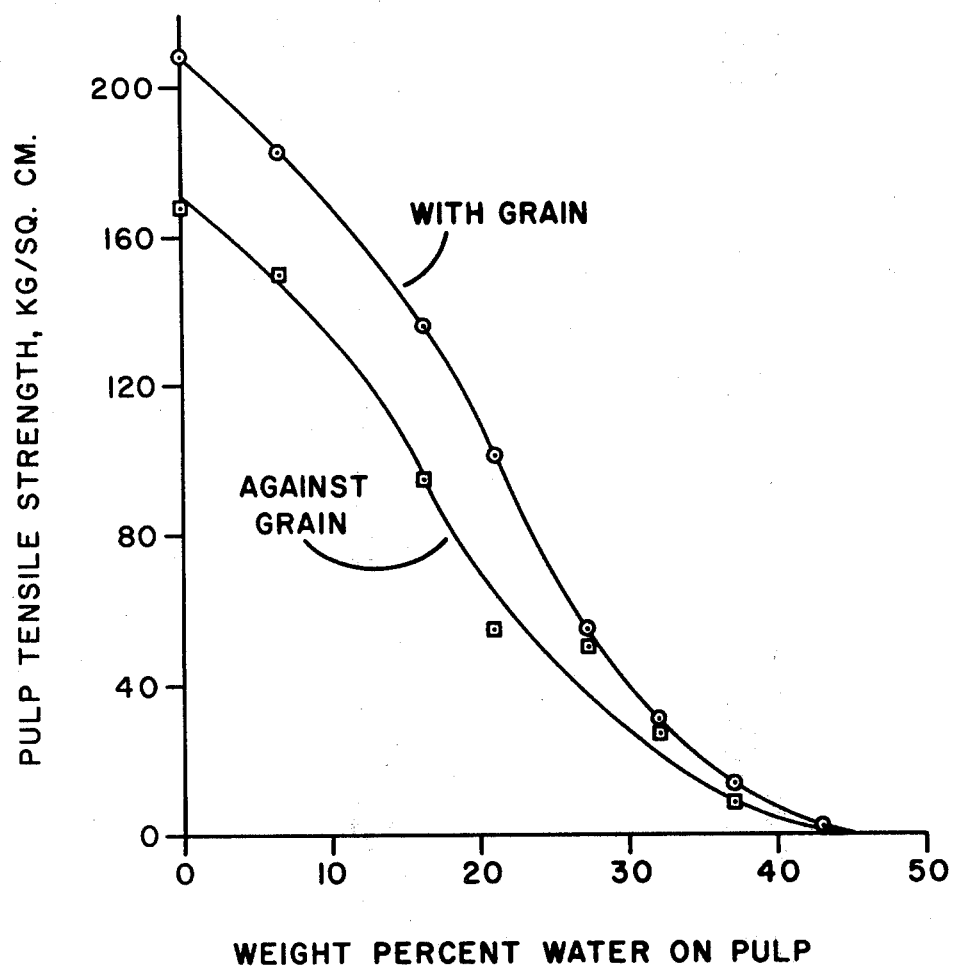
FIG. 2 is a graph of the tensile strength of wood pulp fiber sheet plotted against the percent by weight water of the sum of fiber plus water. One curve is for the strength in the principal direction of the fiber (machine direction) and the other is for the cross-machine direction, both curves being extrapolated to zero tensile strength.

The fiber bundles are separated and high modulus composites prepared directly from wood pulp by moistening pulp sheet and mixing with rubber in a Brabender mixer where the pulp is fiberized and dispersed in the rubber. The wet pulp sheet is first mixed with the rubber, filler, zinc oxide, stearic acid and antidegradant, followed by the addition of curatives and bonding ingredients. The water is at least partially evaporated concurrently with the mixing. Typical formulations of the resulting composites of fiber and rubber compositions constituting the matrix are set forth below. The vinyl pyridine-styrene butadiene copolymer is primarily a bonding ingredient obtained by drying the latex and adding as a dry ingredient along with the curatives and resorcinol-based bonding resin. See Wright U.S. Pat. No. 3,817,778. The use of the resin as a matrix additive for bonding is described by Morita U.S. Pat. No. 3,816,361. The formulations are shown on a dry basis; but it will be understood that the wood pulp is added as wet pulp sheet, the percent of water wet wood pulp that is water being 46%, 45%, 39% and 47% respectively, in making the four formulations described below:

| | Composition | | | |
|---|---|---|---|---|
| | 1 | 2 | 3 | 4 |
| | Parts by Weight | | | |
| Natural Rubber | 100 | 100 | 100 | 100 |
| Vinyl pyridine/SBR copolymer | 5.3 | 7.5 | 14 | 25 |
| Silica | 50 | 10 | 10 | 10 |
| Carbon Black | 0 | 40 | 40 | 40 |

| | Composition | | | |
|---|---|---|---|---|
| | 1 | 2 | 3 | 4 |
| | Parts by Weight | | | |
| Zinc Oxide | 5 | 5 | 5 | 5 |
| Stearic Acid | 2 | 2 | 2 | 2 |
| N-1,3-dimethylbutyl-N'-phenyl-p-phenylenediamine | 2 | 2 | 2 | 2 |
| Sulfur | 2.5 | 2.5 | 2.5 | 3.1 |
| N-tertiary butyl-2-benzothiazole sulfenamide | .5 | .5 | .5 | .6 |
| Hexamethylenetetramine | 1.5 | 1 | 1 | 1.2 |
| Resorcinol-based bonding resin | 5 | 5.5 | 5 | 6.2 |
| Wood cellulose (dry basis) | 53 | 62 | 150 | 250 |
| Volume % cellulose fiber | 20 | 23 | 40 | 50 |

The compositions are dried to constant weight and then returned to the Brabender for addition of the curatives and bonding ingredients. Composition No. 4, in which the fiber is about 56% by weight of the composition is crumbly and shows weak cleavage planes, but is still processable. Fiber orientation is effected in all of the compositions by milling on a differential speed mill and the compositions vulcanized in a press for 20 minutes or more at 153° C. under 17.6 kg/cm$^2$ pressure. Results are essentially the same from 20–60 minutes' cure time. The physical properties of the vulcanizates are set forth below:

TABLE I

| | Composition | | | |
|---|---|---|---|---|
| | 1 | 2 | 3 | 4 |
| Young's modulus (kg/cm$^2$) | 2330 | 4560 | 11560 | 11200 |
| Ultimate elongation, percent | 18 | 10 | 5 | 3 |
| Ultimate tensile strength (kg/cm$^2$) | 248 | 339 | 465 | 312 |

The modulus and tensile properties are indicative of effective fiberization, dispersion of fiber without breakage and reinforcement of the matrix.

Another method of determining the effectiveness of fiber separation is to cut a strip of a fiber-reinforced black rubber stock and count the number of agglomerates. Any agglomerates appear as white spots against a black background and are clearly visible. Preliminary experiments with hardwood pulp sheets of varying water content mixed in a Banbury mixer under various mixing conditions with rubber matrix material show that a water content of about 40% is optimum for a low agglomerate count.

To facilitate a systematic demonstration of the effect of water on agglomerate count, a masterbatch is prepared of the following composition:

| Masterbatch | Parts by Weight |
|---|---|
| Natural Rubber | 50 |
| Styrene-butadiene copolymer rubber (SBR 1502) | 54 |
| Carbon Black | 56.6 |
| N-1,3-dimethylbutyl N'-phenyl-p-phenylenediamine | 2 |
| Stearic Acid | 1 |
| Zinc Oxide | 3 |
| Hydrocarbon Oil (Sundex 790) | 6.4 |
| Resorcinol | 0.3 |

-continued

| Masterbatch | Parts by Weight |
|---|---|
| Resorcinol-based bonding resin | 2.1 |

The wet pulp sheet, curatives and hexamethoxymethylmelamine as further bonding agent are then mixed to prepare compositions in which water is the variable.

| | Parts by Weight |
|---|---|
| Masterbatch | 175.4 |
| Wood Pulp (dry weight) | 29.0 |
| Sulfur | 2.0 |
| N-Ter.butyl-2-benzothiazole sulfenamide | 1.0 |
| Hexamethoxymethylmelamine resin (Resimene 3520) | 2.0 |
| Water | variable |

The water in parts by weight per hundred parts of bone dry cellulose fiber and also as percent of the sum of fiber plus water is shown in the tables below. Wood pulp sheets of different sources designated "JB" "AC" and "BC" are used in making the compositions. The compositions in amount of 1050 grams on a dry basis are mixed in a BR Banbury (1688 cc capacity) at slow speed with cooling water on full. Three mixtures of each formulation of JB fiber are prepared by mixing at 3, 6, and 9 minutes, respectively. The mixing of the other fibers is 3 and 6 minutes, respectively. The power consumed in the mixing is noted and recorded. The three-minute mixing time is too short for adequate dispersion, and the invention is hereinafter illustrated only by the results from longer mixing times.

The water content of the fiber expressed as parts by weight for the compositions prepared using wood pulp sheet from three different sources are summarized below:

| From JB Fiber Composition No. | 12 | 13 | 14 | 15 | 16 | 17 | 18 | 19 | 20 |
|---|---|---|---|---|---|---|---|---|---|
| Water, parts by weight | 0 | 3.2 | 7.4 | 11.3 | 13.5 | 15.5 | 19.3 | 29.0 | 35.4 |

| From AC Fiber Composition No. | 21 | 22 | 23 | 24 | 25 |
|---|---|---|---|---|---|
| Water, parts by weight | 0 | 3.2 | 11.3 | 15.5 | 19.3 |

| From BC Fiber Composition No. | 26 | 27 | 28 | 29 | 30 |
|---|---|---|---|---|---|
| Water, parts by weight | 0 | 3.2 | 11.3 | 15.3 | 19.3 |

The mixtures are transferred to an even speed mill to orient the fiber and are sheeted out to 1.14 mm. They are cured the next day by heating in a press for 35 minutes at 153° C. Dispersion counts of unopened white fiber clumps were made from razor cuts in the green sheets. The results with JB fiber are shown in Table II. Results from a control composition mixed 3 minutes are also recorded using wood fiber pretreated according to the aforesaid Hamed patent, the final composition being substantially identical to those in which the fiber had about 10% moisture.

TABLE II

| Composition No. | Mixing Time, Minutes | Power Input KOH | Dispersion Count /100 cm$^2$ | Water - % by weight of the sum of Fiber and Water |
|---|---|---|---|---|
| 12 | 6 | .556 | 121 | 0 |
| | 9 | .773 | 158 | 0 |
| 13 | 6 | .546 | 390 | 10.0 |
| | 9 | .770 | 280 | 10.0 |
| 14 | 6 | .550 | 245 | 20.3 |
| | 9 | .784 | 65 | 20.3 |
| 15 | 6 | .574 | 218 | 28.0 |
| | 9 | .799 | 63 | 28.0 |
| 16 | 6 | .571 | 107 | 31.8 |
| | 9 | .806 | 51 | 31.8 |
| 17 | 6 | .562 | 69 | 34.8 |
| | 9 | .817 | 15 | 34.8 |
| 18 | 6 | .557 | 8 | 40.0 |
| | 9 | .754 | 5 | 40.0 |
| 19 | 6 | .352 | 705 | 50.0 |
| | 9 | .489 | 75 | 50.0 |
| 20 | 6 | .323 | 2060 | 55.0 |
| | 9 | .466 | 177 | 55.0 |
| control pretreated fiber | | .336 | 2.2 | — |

The results show that a water content of 40% is about optimum for minimum count of JB fiber agglomerates. The count that is acceptable will depend upon the particular use for which the composite is intended. The results are indicated graphically in FIG. 1, and it will be noted that the contour of the curve is similar for 3-minute mixing, although the mixing time is too short for low agglomerate count.

Composition No. 18 is repeated by mixing the masterbatch and wet pulp sheet for 6 minutes; then the curatives and hexamethoxymethylmelamine resin are added later, according to the following schedule: Procedure A—curatives and resin added later in the same day; Procedure B—curatives and resin added the following day. Micro tensile specimens according to ASTM specifications D-1708 are cut in the direction of orientation and pulled at 1.25 cm/minute on a tensile tester. The results set forth in Table III show that bonding is improved by allowing the composite to dry before adding the curatives and the remainder of the bonding system.

TABLE III

| Procedure | Power Input KWH | Dispersion Count /100 cm$^2$ | Tensile Strength kg/cm$^2$ | Young's Modulus kg/cm$^2$ | Ult. Elongation, % |
|---|---|---|---|---|---|
| A (same day) | .763 | 0 | 111 | 914 | 291 |
| B (second day) | — | 0 | 165 | 1103 | 37 |

The results from 6-minute mixing a AC and BC fiber compositions are summarized in Table IV.

TABLE IV

| Composition No. | Power Input KOH | Dispersion Count/ 100 cm² | Water - % by weight of the sum of Fiber and Water |
|---|---|---|---|
| 21 | .550 | 11.4 | 0 |
| 22 | .554 | 387.9 | 10 |
| 23 | .559 | 92.6 | 28 |
| 24 | .548 | 58.1 | 34.8 |
| 25 | .543 | 12.7 | 40 |
| 26 | .562 | 51.6 | 0 |
| 27 | .516 | 459.0 | 10 |
| 28 | .562 | 103.6 | 28 |
| 29 | .528 | 62.6 | 34.8 |
| 30 | .536 | 24.7 | 40 |

The results show that the effect of water on other wood pulp sheet is similar to the effect on JB fiber. A minimum number of agglomerates is observed at about 40% water. Although the count of agglomerates in composition 21 which contains no water is even lower than with 40% water, the fiber damage is excessive. The Young's modulus of the vulcanization is less than half that of the vulcanizates prepared from compositions to which water had been added.

Strengths of typical wood pulp sheets equilibrated to air are shown in Table V. The values represent the force to separate the fiber—not the strength of the individual fibers. Micro samples 0.476 cm wide, in accordance with aforesaid ASTM specification D1078, are cut both in the direction of the majority of the fiber lengths which is the machine direction of the pulp sheet and at right angles thereto. The samples are of comparable weight; and, presumably, contain about the same number of fibers. The strengths are set forth both in kilograms and in kg/cm² calculated from the sample width and thickness.

TABLE V

| Wood Pulp | Sample Wt. grams | Sample Thickness cm. | Major Fiber Direction | | Cross-Fiber Direction | |
|---|---|---|---|---|---|---|
| | | | kg. | kg./cm² | kg. | kg./cm² |
| AC | .272 | .180 | 1.27 | 15 | 1.07 | 12 |
| BP | .268 | .127 | 2.93 | 48 | 2.16 | 36 |
| BC | .267 | .104 | 4.58 | 92 | 3.18 | 64 |
| NB | .256 | .099 | 6.26 | 133 | 5.22 | 110 |
| JB | .280 | .116 | 8.85 | 159 | 6.85 | 123 |

From the results set forth in Table V, it is apparent that the wood pulps tested possess significant tensile strengths.

The addition of water reduces the tensile strength to a very low value, as shown in FIG. II. Extrapolation indicates that zero tensile strength is reached at about 45% water, which correlates well with the observation on agglomerate counts. The results are obtained by placing given quantities of JB fiber in plastic bags and allowing them to equilibrate overnight. Moisture content is then determined by placing a known weight of the wet sample on a balance fitted with a heat lamp for driving off moisture (Ohaus Moisture Balance). Dumbbell test strips are cut from the wood pulp so treated both with the grain of the fiber and against the grain and pulled on a tensile testing machine. The results on samples having high enough wet strength to measure are recorded in Table VI.

TABLE VI

| Water - % by weight of wood pulp plus water | Tensile Strength with grain kg/cm² | Tensile Strengths Against grain kg/cm² |
|---|---|---|
| 0 | 208 | 168 |
| 6.5 | 182 | 150 |
| 16.1 | 136 | 95 |
| 20.9 | 101 | 55 |
| 27.3 | 55 | 51 |
| 32.0 | 31 | 28 |
| 37.1 | 14 | 9 |
| 43.0 | 2.5 | 2 |

When the same fiber is treated with process oil at 22% by weight of the fiber plus oil, the tensile strength with the grain is 157 kg/cm².

Fiber compositions which are about 40% water mixed at 6 minutes in the BR Banbury at slow speed are the optimum for all of the fiber. This corresponds to a work input of 0.53 kilowatt-hours per kilogram. With less mixing, dispersion is poorer; and with more mixing, there is loss of physical properties. However, there is little difference in the dispersability of the pulp types despite substantial variations in the initial pulp sheet tensile strengths. The degree of dispersion continues to improve as water is added up to about 40% of the wet fiber weight; then, at higher water levels, dispersion and tensile properties diminish. Tensile properties are subject to considerable scatter, due to variable bonding but are relatively insensitive to fiber dispersion. It is preferred to dry the compositions either at ambient or elevated temperature before adding the curatives and hexamethoxymethylmelamine bonding resin. The adverse effect of water on fiber bonding as reflected by some loss in tensile strength is thereby reduced as shown in Table III. Although some of the compositions described above contain process oil, equivalent properties are obtained in its absence.

It will be noted from Table VI that at high water content the tensile strengths fall to low values. On the other hand, wood pulp slurry initially dried in an uncompacted state and then allowed to equilibrate with atmospheric moisture before compaction having a tensile strength of about 0.56 kg/cm² disperses adequately without noticeable fiber damage and requires no added water. There should, in any case, be sufficient moisture present to minimize fiber damage. The amount of polymer to provide a continuous phase will, in general, be more than 50 parts by weight per 100 parts by weight of dry fiber; and, preferably, at least 75 parts by weight.

As illustrative of the process using a low concentration of fiber, a low concentration of JB pulp is dispersed in a natural rubber formulation comprising:

| | Parts by Weight |
|---|---|
| Natural Rubber | 127.0 |
| Carbon Black (FEF) | 50.8 |
| Silica (Hi-Sil EP) | 12.7 |
| Zinc Oxide | 6.4 |
| Stearic Acid | 2.5 |
| N-1,3-dimethylbutyl-N'-phenyl-p-phenylenediamine | 2.5 |
| JB pulp equilibrated to air | 2.0 |
| Water | 2.0 |

The stock is mixed in a Brabender mixer (Type C.E.E.6, No. 0030/S.B.) for 6 minutes at 60 rpm using a 70° C.

temperature setting. No white clumps are visible in the mixed composite.

Wet JB pulp is mixed into a polyethylene blend at two concentration levels to demonstrate applicability of the wet fiber process to thermoplastics. In the first formulation, the fiber is 10.3 parts per 100 of the sum of polyethylene and rubber.

|  | Parts by Weight |
|---|---|
| Polyethylene | 180 |
| Ethylene vinyl acetate rubber | 11 |
| Carbon Black (FEF) | 48 |
| JB pulp (equilibrated to air) | 19.7 |
| Water | 30.3 |

The wet pulp is added slowly to the other ingredients in the aforementioned Brabender mixer over a 15-minute period, at 60 rpm, 140° C. Mixing is continued for 6 minutes after the last pieces of wet pulp are added. The dispersion is good—13.8 small undispersed clumps/100 cm$^2$.

In the second formulation, the fiber is 15.9 parts by weight per 100 of the sum of the polyethylene and rubber and comprises:

|  | Parts by Weight |
|---|---|
| Polyethylene | 170 |
| Ethylene vinyl acetate rubber | 10.4 |
| Carbon Black (FEF) | 45.2 |
| JP pulp (equilibrated to air) | 28.7 |

The second formulation is prepared by adding additional wet JB fiber (25 parts by weight wet fiber containing 63 wt. % water including that in the equilibrated pulp) to the mix of the first formulation over a period of 3.5 minutes. The mixing is continued for various time periods after the last pieces of pulp are added and the dispersion evaluated. The results are recorded in Table VII.

TABLE VII

| Mix time, minutes | Dispersion, clumps/100 cm$^2$ |
|---|---|
| 6 | 43 (some large) |
| 11 | 10 |
| 13 | 3 |

Factors which influence dispersing wet fiber into a thermoplastic polymer comprise use of carbon black to increase melt viscosity, use of additional water on the pulp to maintain wetness at the higher temperature needed and rate of wet pulp addition. Slow addition of pulp avoids formation of large clumps which dry out before being dispersed. Addition of ethylene vinyl acetate rubber to the polyethylene is believed to plasticize and provide better wet-out of the fibers.

To illustrate the process of the invention in a typical poly(vinylchloride) (PVC) floor tile formulation, the following ingredients were mixed in a Brabender Plasticorder Mixer (Type EPL-V302):

| Material | Formula Weight |
|---|---|
| PVC (Borden VC-113 FL) | 100 |
| Plasticizer (Monsanto Santicizer ® 160) | 32 |
| CaCO$_3$ (Stan-White 350) | 550 |
| Carbon Black | 2 |
| Wood pulp | 14 |

-continued

| Material | Formula Weight |
|---|---|
| TOTAL | 698 |

The PVC and plasticizer were stirred together before charging to the mixer, then added, together with the CaCO$_3$ and carbon black. The ingredients were mixed at 60 rpm at a temperature setting of 120° C. to a nearly constant torque before the pulp was added. Mixing variables are summarized in Table VIII, following.

TABLE VIII

| Run | Type Pulp | Pulp Mixing Time, Min. | Torque, Nm Max., after pulp add'n. | At end of cycle |
|---|---|---|---|---|
| 1 | P | 1 | 32.0 | 31.0 |
| 2 | P | 2 | 33.5 | 30.5 |
| 3 | P | 4 | 32.5 | 25.0 |
| 4 | JB | 1 | 28.3 | 28.3 |
| 5 | JB | 2 | 28.5 | 28.1 |
| 6 | JB | 4 | 28.5 | 25.5 |
| 7 | P* | 2 | 38.5 | 27.1 |
| 8 | JB* | 2 | 34.8 | 29.8 |

*7 parts water added to pulp before charging to mixer.

In all runs the batch temperature was 137°–139° C. before the pulp was added, and reached 145°–148° C. at the end of the mixing cycle.

After mixing, the samples were pressed out in a cold press to form flat sheets. The sheets were cooled to room temperature and cracked with a hammer. Undispersed particles of pulp were counted on the fracture surfaces, with the aid of a microscope. All samples were about 4 mm. in thickness, and the length of cracked surface, over which particles were counted, was measured, so that an areal density of undispersed particles could be calculated. Particles were counted if they exceeded about 0.75 mm in diameter. Measurements and calculations are set forth in Table IX, following.

TABLE IX

| Sample | No. Counts | Thickness, mm. | Surface Length, cm. | Density Counts/100 cm$^2$ |
|---|---|---|---|---|
| 1 | 86 | 3.81 | 93.5 | 241 |
| 2 | 54 | 4.06 | 112.5 | 118 |
| 3 | 12 | 3.61 | 110.7 | 30 |
| 4 | 163 | 3.94 | 128.3 | 323 |
| 5 | 125 | 3.78 | 128.3 | 258 |
| 6 | 40 | 3.68 | 140.7 | 78 |
| 7 | 34 | 3.78 | 97.3 | 93 |
| 8 | 110 | 3.51 | 110.7 | 283 |

In general, pulp P dispersed better than pulp JB, and all dispersion improved with mix time. Pulp P had improved dispersion with added water, although no improvement was seen when water was added to JB pulp.

In order to determine the effect of a much longer mixing time on the dispersion of untreated wood fiber in PVC, another trial was performed, using the following formulation:

| Material | Formula Weight |
|---|---|
| PVC (Borden VC-113FL) | 100 |
| Plasticizer (Monsanto Santicizer ® 160) | 32 |
| CaCO$_3$ (Stan-White 325) | 550 |
| TOTAL | 682 |

The above ingredients were charged to the Plasticorder as before, set at a speed of 60 r.p.m. The temperature of the batch leveled off at 136° C., and the torque dropped to 21.5 Nm. To add color, 1.5 phr of N-550 carbon black was added, which did not increse the torque reading. Then 12.5 phr of as-received "P" type wood pulp were added, immediately raising the torque to 31.5 Nm. The total batch was mixed for nine minutes after pulp addition, finishing at a temperature of 142° C. and a torque of 23.5 Nm. Samples were sheeted out, cooled and cracked as before. The density of undispersed particles, calculated as above, was 2 counts per 100 cm². The effect of extended mixing was, thus, to reduce the amount of undispersed fiber clump to an extremely low level, based on the results in Table IX, supra.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. The method of making a composite of polymeric matrix and wood pulp which comprises masticating such proportion of polymeric matrix including massed polymer as provides a continuous phase, agglomerated wood pulp having a tensile strength below about 10 kg./cm.² regardless of the direction of measurement and such amount of water as to provide the aforesaid tensile strength, wherein the polymeric matrix is present in an amount of at least 50 parts by weight based on 100 parts by weight of dry wood pulp.

2. The method of claim 1 wherein the matrix is elastomeric.

3. The method of claim 2 wherein the matrix comprises vulcanizable elastomer and carbon black.

4. The method of claim 3 wherein the wood pulp has a tensile strength below about three kg/cm².

5. The method of making a composite of elastomeric matrix reinforced with wood pulp which comprises masticating a major proportion of elastomeric matrix, including massed elastomer and a minor proportion, on a dry basis, of agglomerated wood pulp together with water in amount within the range of 35–65% of the sum of the wood pulp plus water.

6. The process of claim 5 wherein the amount of water is within the range of 35–50%.

7. The process of claim 6 wherein the elastomeric matrix includes a particulate filler.

8. The process of claim 7 which includes drying the mixture of wet fiber and matrix followed by adding bonding ingredients and curatives and curing the composition.

9. The process of claim 1 wherein the matrix is poly(vinylchloride).

* * * * *